United States Patent [19]

Watanabe

[11] Patent Number: 4,542,514
[45] Date of Patent: Sep. 17, 1985

[54] METHOD OF MEASURING QUALITY OF A SIGNAL RECEIVED BY A RECEIVER OF A TWO-DIMENSIONAL LINEAR MODULATION DATA COMMUNICATION SYSTEM

[75] Inventor: Kojiro Watanabe, Tokyo, Japan

[73] Assignee: NEC Corporation, Tokyo, Japan

[21] Appl. No.: 539,017

[22] Filed: Oct. 4, 1983

[30] Foreign Application Priority Data

Oct. 4, 1982 [JP] Japan ................................. 57-174337
Oct. 19, 1982 [JP] Japan ................................. 57-183225

[51] Int. Cl.$^4$ ............................................. H04B 1/12
[52] U.S. Cl. ......................................... 375/10; 375/99;
375/101; 375/102; 455/305; 328/163; 328/166
[58] Field of Search ....................... 375/10, 51, 57, 58,
375/99, 101, 102, 118; 455/304, 305, 63;
328/135, 163, 166

[56] References Cited

U.S. PATENT DOCUMENTS

| 3,404,229 | 10/1968 | Downey et al. | 375/57 |
| 3,753,123 | 8/1973 | Carpenter et al. | 455/305 |
| 3,882,540 | 5/1975 | Otteson | 360/39 |
| 4,106,102 | 8/1978 | Desblache | 375/103 |

Primary Examiner—Robert L. Griffin
Assistant Examiner—Raymond C. Glenny
Attorney, Agent, or Firm—Sughrue, Mion, Zinn, Macpeak & Seas

[57] ABSTRACT

A quality measure of a signal received at a receiver of a two-dimensional linear modulation data communication system, is measured by using a phase controlled baseband signal ($y_k \cdot \exp(j\phi_k)$) obtained from the received signal and a reproduced data signal ($x_k$) derived from the phase controlled baseband signal. That portion of the quality measure which is introduced into the received signal in a transmission channel for the received signal, is measured by estimating a data signal component ($y_k$) which includes intercode interference, by subtracting the data signal component from the phase controlled baseband signal to produce a difference signal of a phase difference relative to the reproduced data signal, by giving the phase difference to the difference signal to produce a phase adjusted signal, and by calculating a mean square of an inphase component of the phase adjusted signal. Portions of the quality measure which are related to a carrier phase jitter component and a carrier frequency offset component, are measured also by the use of the phase controlled baseband signal and the reproduced data signal. It is possible to carry out the method by a signal processor.

4 Claims, 9 Drawing Figures

4,542,514

METHOD OF MEASURING QUALITY OF A SIGNAL RECEIVED BY A RECEIVER OF A TWO-DIMENSIONAL LINEAR MODULATION DATA COMMUNICATION SYSTEM

BACKGROUND OF THE INVENTION

This invention relates to a method for use in a receiver of a two-dimensional linear modulation data communication system in measuring signal quality of a signal received through a transmission channel of the system.

In a two-dimensional linear modulation data communication system, such as a quadrature phase amplitude modulation (QAM) data communication system, a transmitter of the system two-dimensionally linearly modulates a carrier by a sequence of transmission symbols or codes to produce a modulated carrier signal. The transmitter transmits the modulated carrier signal to a receiver through a transmission channel or path. The transmission channel may be a telephone channel. The receiver receives the modulated carrier signal as a received signal and carries out coherent detection thereon to produce a phase controlled baseband signal and then a reproduced data signal which is reproduced from the phase controlled baseband signal to give a reproduction of the data symbol sequence.

In such a data communication system, it is important upon occurrence of a problem to rapidly discover the causes of the problem and take an appropriate countermeasure to get rid of the causes. Main causes are defects in the transmitter and/or the receiver and degradation of performance of the transmitter channel.

In general, a conventional modem of the transmitter or the receiver produces an interface signal called signal quality. The interface signal has been used in carrying out the in-service monitoring as called in the art to always monitor performance of the communication system during service thereof. The in-service monitoring makes it possible to detect a possibility of a problem and thereby to take a suitable countermeasure.

The interface signal is, however, representative of an overall result of various factors. More particularly, the overall result is a mixture of factors dependent on the state of operation and the performance of the receiver and other factors which result from degradation of the transmission channel and can not be dealt with even by a receiver of the highest possible performance. If the trouble is liable to occur due to disorder of the receiver, the countermeasure should be either to check the operation of the receiver or to switch the receiver to a standby receiver. If the trouble comes from the transmission channel, the countermeasure should be either to use another transmission channel or to reduce the rate of transmission of the data symbols. It is therefore desirable to analyze the causes of trouble and divide them into those resulting from noise superimposed on the modulated carrier signal during propagation through the transmission channel, those resulting from carrier phase jitter introduced to the modulated carrier signal in the transmission channel, and those resulting from carrier frequency offset introduced to the modulated carrier signal in the transmission channel. There has, however, been no method of individually measuring a quality measure of the received signal with the quality measur divided into portions dependent on the noise and on carrier phase disturbance which comprises the carrier phase jitter and the carrier frequency offset.

SUMMARY OF THE INVENTION

It is therefore a general object of the present invention to provide a method of measuring a quality measure of a signal received at a receiver of a two-dimensional linear modulation data communication system.

It is a specific object of this invention to provide a method of the type described, which makes it possible to measure that portion of the quality measure which is affected by a noise component introduced into the received signal in a transmission channel of the system.

It is another specific object of this invention to provide a method of the type described, which makes it possible to measure that portion of the quality measure which is affected by a carrier phase disturbance component introduced into the received signal in the transmission channel.

It is a more specific object of this invention to provide a method of the type described, which enables that portion of the quality measure to be measured which is affected by a carrier phase jitter component introduced into the received signal by the transmission channel.

It is another more specific object of this invention to provide a method of the type described, which enables that portion of the quality measure to be measured which is affected by a carrier frequency offset component introduced into the received signal by the transmission channel.

It has now unexpectedly been confirmed that a quality measure of the type represented by the above-mentioned interface signal, is divisible into portions related to the noise and the carrier phase disturbance and that such a quality measure is measurable by the use of a phase controlled baseband signal derived in the receiver from the received signal and a reproduced data signal reproduced in the receiver from the phase controlled baseband signal.

A method according to this invention is for use in a receiver of a two-dimensional linear modulation data communication system wherein the receiver is responsive to a received signal received through a transmission channel of the system for producing a phase controlled baseband signal and a reproduced data signal derived from the phase controlled baseband signal. The method is for measuring a quality measure of the received signal by using the phase controlled baseband signal and the reproduced data signal with the quality measure divided into portions related to a noise component, a carrier phase jitter component, and a carrier frequency offset component, each of which is introduced into the received signal in the transmission channel.

DESCRIPTION OF THE PREFERRED EMBODIMENTS

Figure 1:
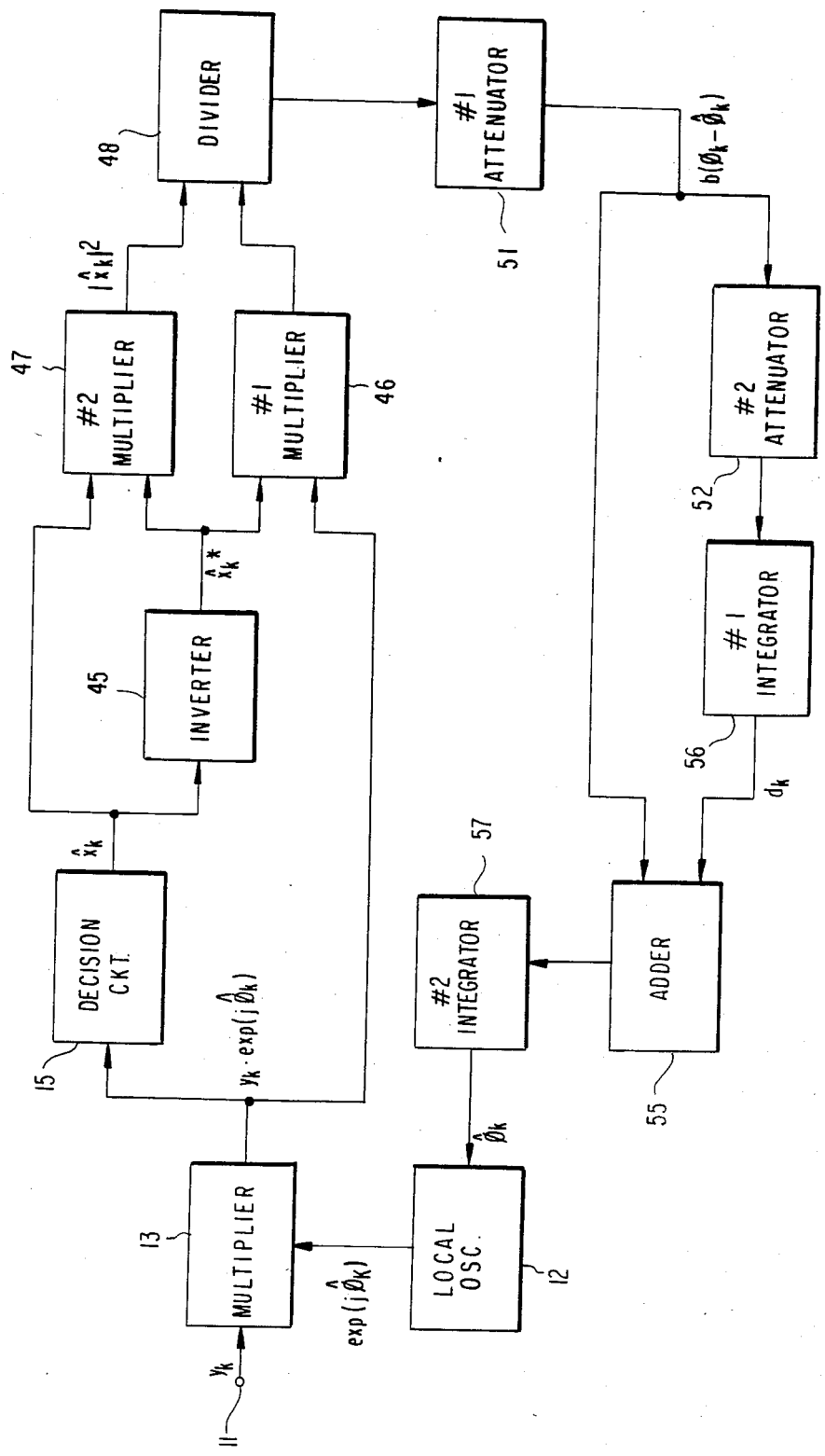
FIG. 1 is a block diagram of a part of a receiver of a two-dimensional linear modulation data communication system.

Referring to FIG. 1, a part of a receiver for use in a two-dimensional linear modulation data communication system will be described at the outset in order to facilitate an understanding of the present invention. As will later become clear as the description proceeds, the receiver comprises as another part an automatic phase control loop for the phase of a local carrier signal which will presently be described.

On describing the receiver, it will be assumed that a transmitter (not shown) of the system is transmitting a carrier which is modulated into a modulated carrier signal by a sequence of transmission symbols or codes $\{x_k\}$ of a common intercode or intersymbol interval T, where k represents integers. The part under consideration is for receiving the modulated carrier signal as a received signal through a transmission channel or path (not shown) and is for subjecting the received signal to coherent detection to produce a baseband signal y(t). The transmission channel may include a fixed or an automatic equalizer. The baseband signal y(t) is written as:

$$y(t) = \sum_{k=-\infty}^{\infty} x_k \cdot h(t - kT) \cdot \exp(j\phi(t)) + n(t),$$

where:

h(t) represents an equivalent impulse response of the transmission channel for the baseband signal y(t);

$\phi(t)$ represents a phase difference between the unmodulated carrier signal and the local carrier signal; and n(t) represents a noise component introduced into the received signal in the transmission channel.

When the baseband signal y(t) is sampled at a sampling period of the intercode interval T, a k-th baseband signal sample $y_k$ is obtained at a k-th sampling instant kT as:

$$y_k = \sum_{i=-\infty}^{\infty} x_i \cdot h_{k-i} \cdot \exp(j\phi_k) + n_k, \quad (1)$$

where:

$h_{k-i}$ represents a (k−i)-th sample of the equivalent impulse response sampled at a (k−i)-th sampling instant (k−i)T;

$\phi_k$ represents an instantaneous phase difference at the k-th sampling instant kT; and $n_k$ represents an instantaneous noise component at the k-th sampling instant kT.

It should be noted in connection with the above that the quantities used in Equation (1) are represented by complex numbers except for the instantaneous phase difference $\phi_k$. For each complex number X, the real part Re[X] and the imaginary part Im[X] give an inphase and a quadrature phase component of the quantity represented by the complex number X, repectively.

In Equation (1), each baseband signal sample $y_k$ depends on an infinitely great number of transmission symbols $x_i$ due to intercode or intersymbol interference which is introduced into the received signal by the equivalent impulse response h(t). It is, however, possible to understand that only a finite number of transmission symbols $x_i$ contribute to each baseband signal sample $y_k$. In other words, it is possible on observing each baseband signal sample $y_k$ to refer to only a set of significant ones of the equivalent impulse response samples $h_{k-i}$, as from a (k−M)-th sample $h_{k-M}$ to a (k+N)-th sample $h_{k+N}$ through a k-th equivalent impulse response sample $h_k$. Under the circumstances, Equation (1) is rewritten into:

$$y_k = \sum_{i=-N}^{M} x_{k-i} \cdot h_i \cdot \exp(j\phi_k) + n_k, \quad (2)$$

where i is used in place of (k−i) for the summation in the first term of the righthand side.

In FIG. 1, a receiver input terminal 11 is supplied with a sequence of baseband signal samples $\{y_k\}$, each of which is represented by Equation (2) as discussed above. A local oscillator 12 is for generated the above-mentioned local carrier signal in response to a phase control signal which appears in the automatic phase control loop to represent an estimated phase difference $\phi_k$ at each sampling instant kT for the instantaneous phase difference $\phi_k$ at that instant as will later be described. With the amplitude assumed to be unity, the local carrier signal has an instantateous complex amplitude $\exp(j\phi_k)$ at the sampling instant kT.

An input multiplier 13 is used for multiplying the baseband signal sample sequence by the local carrier signal to produce a phase controlled baseband signal. A decision circuit 15 is responsive to the phase controlled baseband signal for deciding or judging an estimated symbol $x_k$ as a desired datum at each sampling instant kT in the manner which is known in the art and will not be described in detail. The decision circuit 15 thereby produces a sequence of estimated symbols or desired data. In ordinary cases, the estimated symbol $x_k$ gives the transmission symbol $x_k$. A sequence of the estimated symbols $\{x_k\}$ is therefore a reproduced data signal representative of the transmission symbol sequence $\{x_k\}$.

Attention will be directed at first to measurement of the power of the noise component n(t). The measurement is carried out by averaging the power of the instantaneous noise component $n_k$ throughout an averaging interval which is not shorter than (M+N+1) sampling periods that is (M+N+1)T. Therefore, the samples and the instantaneous values of the quantities at each sampling instant kT will mainly be used in the following in place of the signals which represent the respective quantities and which may last a considerable length of time. Merely for convenience of description, it will be assumed that the averaging interval is L sampling periods, LT, such as thirty sampling periods, long.

As seen from Equation (2), the baseband signal $y_k$ includes the desired data $x_k$, intercode interference, and carrier phase disturbance, such as carrier phase jitter, in addition to the noise component $n_k$. Components other than the noise component $n_k$ will be removed from the baseband signal $y_k$ assuming for the time being that the phase disturbance is nil.

As will later be described, it is possible for each baseband signal sample $y_k$ to iteratively get a set of estimated impulse response samples $h_i$ at a $(k+N)$-th sampling instant $(k+N)T$. By the use of such a set of estimated impulse response samples $h_i$, a quantity $y_k$ will be taken into consideration at the sampling instant $(k+N)T$. The quantity $y_k$ is defined by:

$$y_k = \sum_{i=-N}^{M} x_{k-i} \cdot h_i, \tag{3}$$

by the use of $(k-M)$-th through $(k+N)$-th estimated symbols $x_{k-M}$ to $x_{k+N}$ which are estimated before and at the sampling instant $(k+N)T$ under consideration. The quantity $y_k$ is a k-th estimated baseband signal sample or an estimated value of that k-th transmission symbol $x_k$ which is influenced by the intercode interference. In other words, a signal representative of the quantity $y_k$ gives an estimation of a data signal component which is included in the received signal under the influence of the intercode interference. When the estimated value $y_k$ is subtracted from the baseband signal samples accumulated up to the $(k+N)$-th sampling instant $(k+N)T$, a difference signal is obtained which represents a difference:

$$y_k - y_k = \sum_{i=-N}^{M} x_{k-i} \cdot h_i \cdot \exp(j\phi_k) + n_k - \sum_{i=-N}^{M} x_{k-i} \cdot h_i,$$

at each sampling instant $kT$.

As described before, the estimated symbol $x_{k-i}$ is ordinarily equal to the transmission symbol $x_{k-i}$. Moreover, it is possible to understand that the estimated impulse response samples $h_i$ are equal to the equivalent impulse response samples $h_i$. As a consequence, the difference is equal to:

$$y_k - y_k = \sum_{i=-N}^{M} x_{k-i} \cdot h_i \cdot [\exp(j\phi_k) - 1] + n_k, \tag{4}$$

which gives the noise component $n_k$ alone if the instantaneous phase difference $\phi_k$ is always equal to zero.

Figure 2:
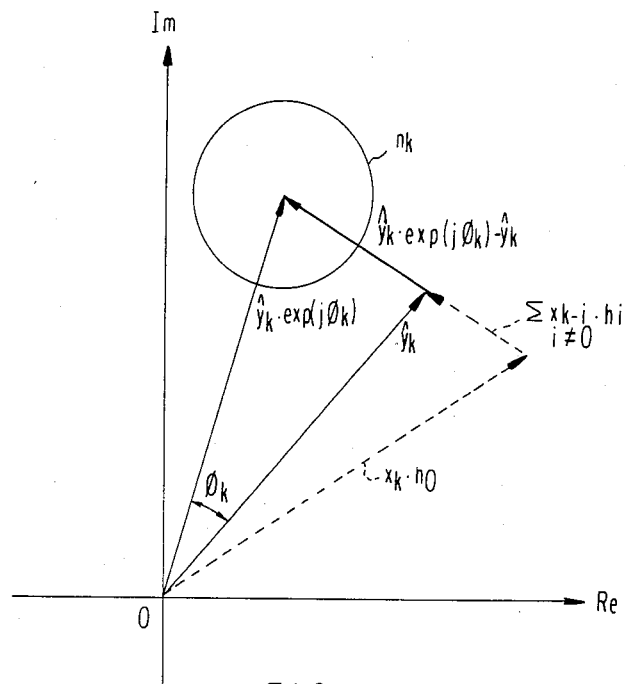
FIG. 2 is a vector diagram for use in describing the principle of a method according to the instant invention.

Turning to FIG. 2 representative of a complex plane Re-Im having an origin O, the difference signal given by Equation (4) will be reconsidered in order to take account of the influence introduced into the baseband signal by the phase disturbance which has been taken out of consideration for a short while. The estimated value $y_k$ defined by Equation (3) is depicted as a vector $y_k$ on the complex plane. When the righthand side of Equation (3) is divided into a product $x_k \cdot h_O$ for $i=0$ and a summation for products for $i \neq 0$, the vector $y_k$ is a sum vector of two vectors shown by dashed lines. When the phase disturbance is not equal to zero, a term $[y_k \cdot \exp(j\phi_k)]$ which appears on the righthand side of Equation (4) is represented by another vector labelled "$y_k \cdot \exp(j\phi_k)$." When the noise component $n_k$ has a certain amplitude, the baseband signal sample $y_k$ is represented by a vector (not shown) having a start point at the origin O and an end point on the circumference of a circle of a radius which is equal to the amplitude of the noise component $n_k$. It is to be noted that the vectors are drawn so that the baseband signal sample $y_k$ may have a positive real part irrespective of the noise component $n_k$.

Figure 3:
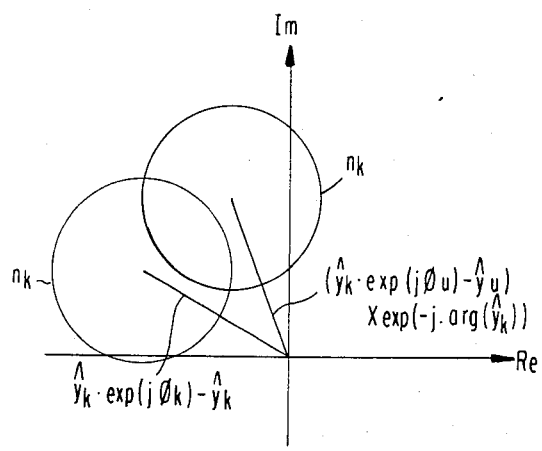
FIG. 3 is another vector diagram for use in describing the principle of the method according to this invention.

Further turning to FIG. 3, a real value $P_k$ will be considered, which is defined by:

$$P_k = Re[(y_k - y_k) \cdot \exp(-j \cdot \arg(y_k))], \tag{5}$$

where $\arg(y_k)$ represents an instantaneous phase of the estimated value $y_k$ of the data signal component subjected to the intercode interference. In other words, the real value $P_k$ represents the in-phase component of a phase adjusted signal which has an amplitude of the difference signal $(y_k - y_k)$ and a phase difference of the instantaneous phase $\arg(y_k)$ relative to the difference signal. The mean square of the real value $P_k$ gives:

$$\overline{P_k^2} = \overline{(Re[n_k \cdot \exp(-j \cdot \arg(y_k))] + |y_k| \cdot (\cos\phi_k - 1))^2} \approx \tag{6}$$

$$\overline{|y_k|^2 \cdot \phi_k^4/4} + \overline{|n_k|^2/2},$$

wherein it is possible to understand that $|y_k|^2$ represents the signal power. Although the noise power $|n_k|^2$ is not directly measurable, the signal power $|y_k|^2$ is measurable.

In general, measurement of the noise component is necessary when the signal-to-noise ratio is worse than 30 dB. In this event, the first term in the righthand side of Equation (6) is not greater than one tenth of the second term. It is sufficient therefor that $\phi_k^4$ be less than $2 \times 10^{-4}$. This usually holds. For example, the phase disturbance is 10° peak-to-peak at most in a telephone channel. In other words, this shows that Equation (6) enables measurement of the noise power. Incidentally, the instantaneous phase $\arg(y_k)$ of the estimated value $y_k$ is equal to an instantaneous phase $\arg(x_k)$ of the reproduced data signal either when the transmission channel includes an automatic equalizer or when it is possible to neglect the effect caused by the intercode interference on the phase disturbance. Substitution of the latter instantaneous phase $\arg(x_k)$ for the first-mentioned instantaneous phase $\arg(y_k)$ facilitates the noise power measurement as will become clear in the following.

Figure 4:
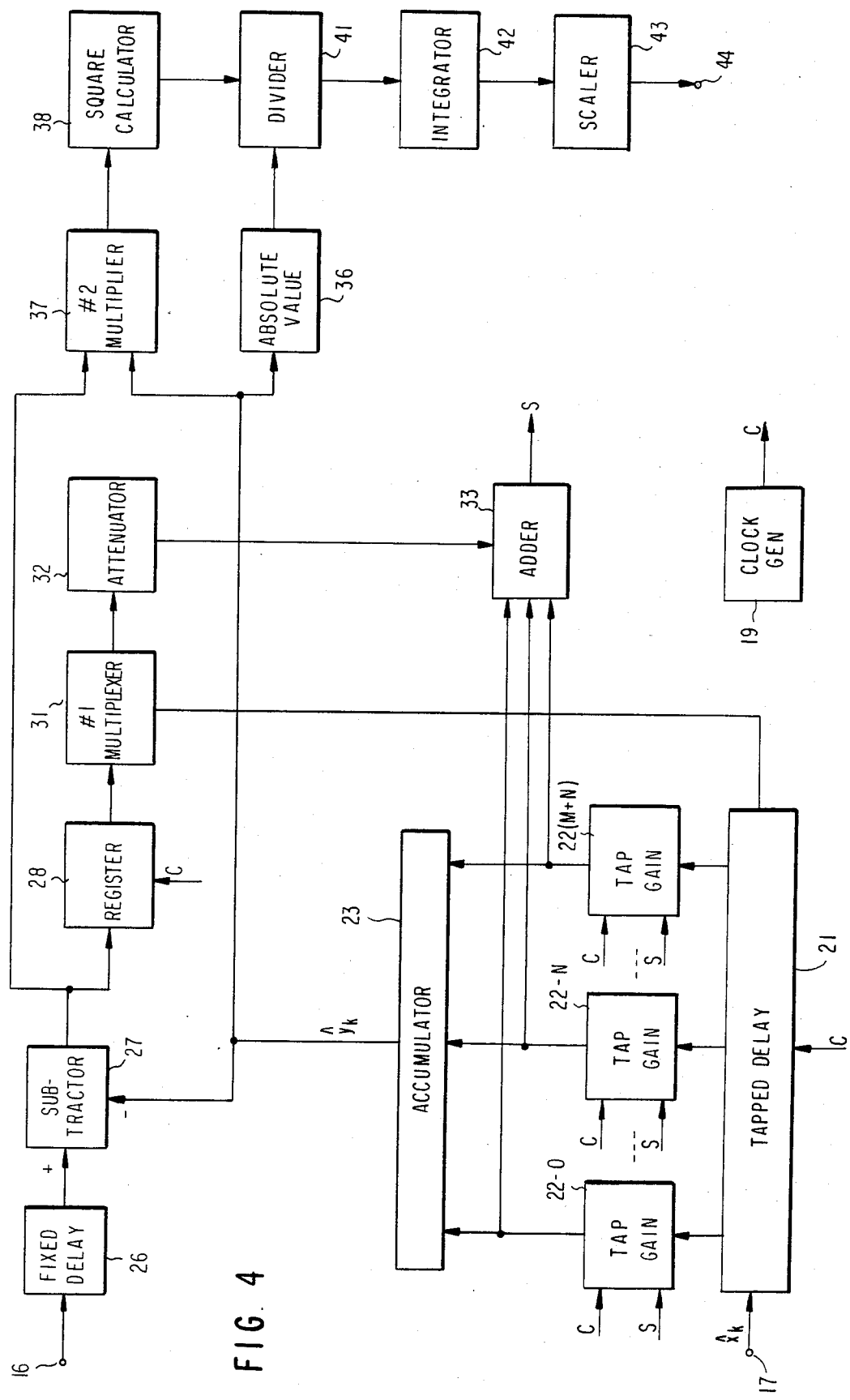
FIG. 4 is a block diagram of a device for use in carrying out a method according to a first embodiment of this invention.

Referring now to FIG. 4, a device for use in carrying out a method according to a first embodiment of this invention, comprises first and second device input terminals 16 and 17 supplied with the phase controlled baseband signal $[y_k \cdot \exp(j\phi_k)]$ from the input multiplier 13 (FIG. 1) and with the reproduced data signal $x_k$ from the decision circuit 15, respectively. A clock generator 19 is for generating clocks C indicative of the sampling instants, such as $kT$.

The reproduced data signal $x_k$ is delivered to a tapped delay unit 21 which has zeroth through $(M+N)$-th taps, $(M+N+1)$ in number, for producing zeroth through $(M+N)$-th successively delayed signals. The tapped delay unit 21 is controlled by the clocks C to produce an N-th one of the successively delayed signals as a specific delayed signal for the purpose which will presently become clear. Zeroth through $(M+N)$-th weighting units 22-0, ..., 22-N, ..., and 22-$(M+N)$ are supplied with the zeroth through the $(M+N)$-th delayed signals, respectively, and controlled by the clocks C like the tapped delay unit 21. As will shortly be described, the zeroth through the $(M+N)$-th weighting units 22 (suffixes omitted) retain zeroth through $(M+N)$-th weights or tap gains, which will be denoted by $h_{-N}, \ldots, h_0, \ldots,$ and $h_M$, respectively. Each weighting unit 22-$i$ ($i$ being zero through $(M+N)$ for the weighting units) is for producing a weighted signal representative of a product of the weight $h_i$ and the delayed signal supplied thereto. Such weighted signals are fed to an accumulator 23 for calculating a summation of the products to produce an accumulation signal representative of the estimated value $y_k$ described above in conjunction with Equation (3).

The phase controlled baseband signal $[y_k \cdot \exp(j\phi_k)]$ is delivered to a fixed delay unit 26 for producing a single delayed signal with a delay of N sampling periods NT. A subtractor 27 is for subtracting the accumulation signal from the single dlayed signal to produce the difference signal of the type described in connection with Equation (4). The difference signal is stored in a register 28 and is derived therefrom in response to the clocks C supplied from the clock generator 19.

A first conjugate complex multiplier 31 is for multiplying the difference signal derived from the register 28 by the specific delayed signal produced by the tapped delay unit 21 in response to each clock C. When supplied with the difference signal representative of a k-th difference $(y_k - y_k)$ from the register 28 in response to a clock C for the k-th sampling instant kT, the multiplier 31 is fed with the specific delayed signal representative of the $(k+N)$-th estimated symbol $x_{k+N}$. The multiplier 31 produces a first conjugate complex product signal representative of a first conjugate complex product $[x_{k+N}{}^* \cdot (y_k - y_k)]$. A constant multiplier 32 is for multiplying the conjugate complex product signal by a small positive constant a to produce an adapted signal. The multiplier 32 may an attenuator. An adder 33 is successively supplied with the weighted signals from the respective weighting units 22 and also with the adapted signal to produce a sum signal S, which is fed back to the weighting units 22 and stored therein by the respective clocks C.

The sum signal S represents at the $(k+N)$-th sampling instant $(k+N)T$ an i-th estimated value $h_i^{k+N}$ for the i-th equivalent impulse response sample $h_i$. As seen from the circuitry described above, such estimated values are given by:

$$h_i^{k+N} = h_i^{k+N-1} + a \cdot x_{k-i}{}^* \cdot (y_k - y_k), \quad (7)$$

as estimated values of the $(k-M)$-th through the $(k+N)$-th equivalent impulse response samples. This shows that the i-th estimated value $h_i$ is obtained at the $(k+N)$-th sampling instant $(k+N)T$ by the estimated gradient method of minimizing the mean square of the differences $(y_k - y_k)$'s. It may be mentioned here that the estimated gradient method is known in the art and is used in an automatic equalizer of the adaptive decision feedback type and that the small positive constant a is known as an adaptation coefficient. A combination of the tapped delay, unit 21, the weighting units 22, and the accumulator 23 serves as a transversal filter responsive to the reproduced data signal $x_k$ for providing the estimated values $y_k$ of the data signal component included in the received signal and influenced by the intercode interference.

Supplied with the accumulation signal, an absolute value unit 36 produces an absolute value signal representative of the absolete value of the estimated value $y_k$. A second conjugate complex multiplier 37 is for multiplying the accumulated signal by the difference signal produced by the subtractor 27 to produce a second conjugate complex product signal representative of a second conjugate complex product $[y_k{}^* \cdot (y_k - y_k)]$. The real part of the second conjugate complex product is delivered to a square calculator 38, which produces a square signal representative of the square of the real part.

A divider 41 is for dividing the square signal by the absolute value signal to produce a quotient signal representative of:

$$(\text{Re}[(y_k - y_k) \cdot \exp(-j \cdot \arg(y_k))])^2,$$

namely, a quantity related to an instantaneous noise power at each sampling instant kT. The quotient signal is integrated by an integrator 42 which is reset at every averaging interval LT described above to producde an averaged signal representative of the noise power. A scaler 43 is used for scaling the noise power to a desired scale to supply a device output terminal 44 with a device output signal representative of the noise power on the desired scale. The scaler 43 may, for example, convert the effective value to a peak-to-peak value.

Figure 5:
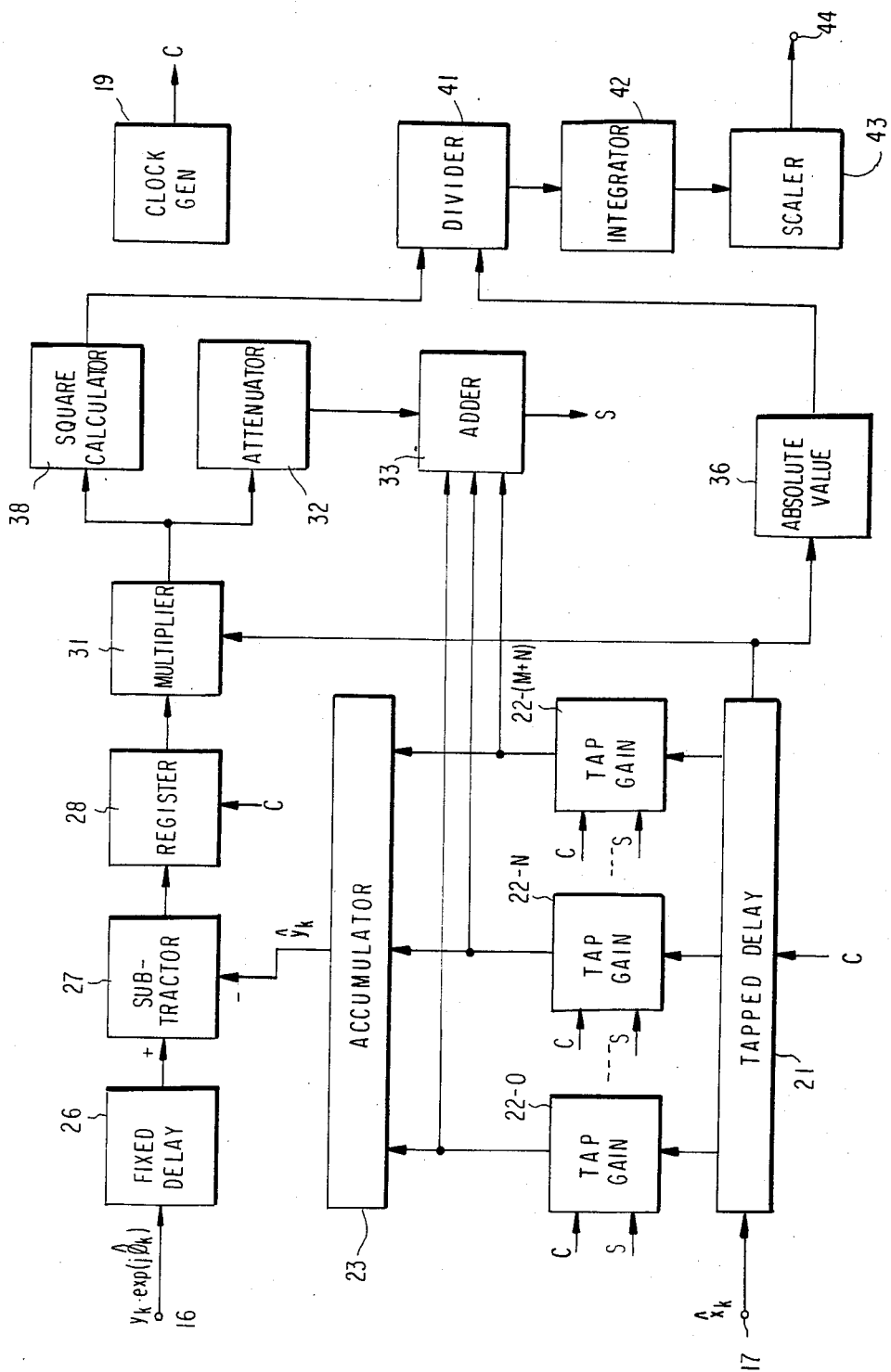
FIG. 5 is a block diagram of a device for use in carrying out a method according to a second embodiment of this invention.

Referring to FIG. 5, a device, for use in carrying out a method according to a second embodiment of this invention, is convenient when it is possible to understand that the instantaneous phase $\arg(y_k)$ of the estimated value of the data signal component influenced by the intercode interference is equal to the instantaneous phase $\arg(x_k)$ of the reproduced data signal. The illustrated device comprises similar parts designated by like reference numerals but for the second conjugate complex multiplier 37.

The absolute value unit 36 is not supplied with the accumulation signal from the accumulator 23 but with the specific delayed signal from the taped delay unit 21. The square calculator 38 is supplied with the first conjugate complex product signal from the first conjugate complex multiplier 31 rather than with the second conjugate complex product signal from the second conjugate complex multiplier 37, which is dispensed with as noted above. The divider 41 produces a quotient signal representative of:

$$(\text{Re}[y_k - y_k) \cdot \exp(-j \cdot \arg(x_k))])^2,$$

namely, a quantity which is again related to an instantaneous noise power at each sampling instant kT under the circumstances. The scaler 43 delivers a device output signal of the above-described type to the device output terminal 44.

Referring back to FIG. 1, the above-mentioned automatic phase control loop is coupled to the input multiplier 13 and the decision circuit 15. An inverter 45 is for producing the real part of each estimated symbol $x_k$ without modification and for inverting the polarity of the imaginary part alone to produce a conjugate complex signal representative of the conjugate complex of the estimated symbol, namely, $x_k{}^*$, at each sampling instant kT. A first multiplier 46 is for multiplying the phase controlled baseband signal by the conjugate complex signal to produce a first product signal representative of a first product $[x_k \cdot y_k \cdot \exp(j\phi_k)]$. A second multiplier 47 is for multiplying the reproduced data signal by the conjugate complex signal to produce a second product signal representative of a second product.

A combination of the inverter 45 and the second multiplier 47 serves as a square calculator for rendering the second product equal to a square of the estimated symbol, namely, $|x_k|^2$. Responsive to the first and the second product signals, a divider 48 produces a quotient signal representative of a quotient which is equal to the first product divided by the second product.

A first attenuator 51 is for giving an attenuation to the imaginary part of the quotient to produce a phase error signal representative of a phase error $(\phi_k - \hat{\phi}_k)$ multiplied by a constant b. The phase error multiplied by the constant b, is given by:

$$b(\phi_k - \hat{\phi}_k) \doteq b \cdot \text{Im}[(x_k \cdot y_k \cdot \exp(j\hat{\phi}_k))/|x_k|^2.$$

The phase error signal is delivered to a second attenuator 52 for giving a further attenuation to the phase error signal to produce an attenuated phase error signal representative of an attenuated phase error, which may be denoted by $c(\phi_k - \hat{\phi}_k)$, where c represents a constant. The phase error signal is furthermore fed to an adder 55. A first integrator 56 is for integrating the attenuated phase error signal to produce an integrated phase error signal representative of an integrated phase error $d_k$ at each sampling instant kT. The integrated phase error $d_k$ is given by:

$$d_k = d_{k-1} + c(\phi_k - \hat{\phi}_k).$$

The adder 55 is for calculating a sum of the phase error signal and the integrated phase error signal to produce a sum signal. A second integrator 57 is for integrating the sum signal to produce the phase control signal, which gives the estimated phase difference $\hat{\phi}_k$ by:

$$\hat{\phi}_k = \hat{\phi}_{k-1} + b(\phi_k - \hat{\phi}_k) + d_k, (\text{mod } 2\pi)$$

Attention will now be directed to measurement of carrier phase disturbance caused to the intantaneous phase difference $\phi_k$ used in Equation (2). It is possible to divide the instantaneous phase difference $\phi_k$ into three components as:

$$\phi_k = \theta_O + \theta_k + f_k, (\text{mod } 2\pi)$$

where:

$\theta_O$ represents a constant phase difference;

$\theta_k$ represents a carrier phase jitter component introduced into the received signal in the transmission channel; and $f_k$ represents a carrier frequency offset component introduced into the received signal in the transmission channel.

Figure 6:
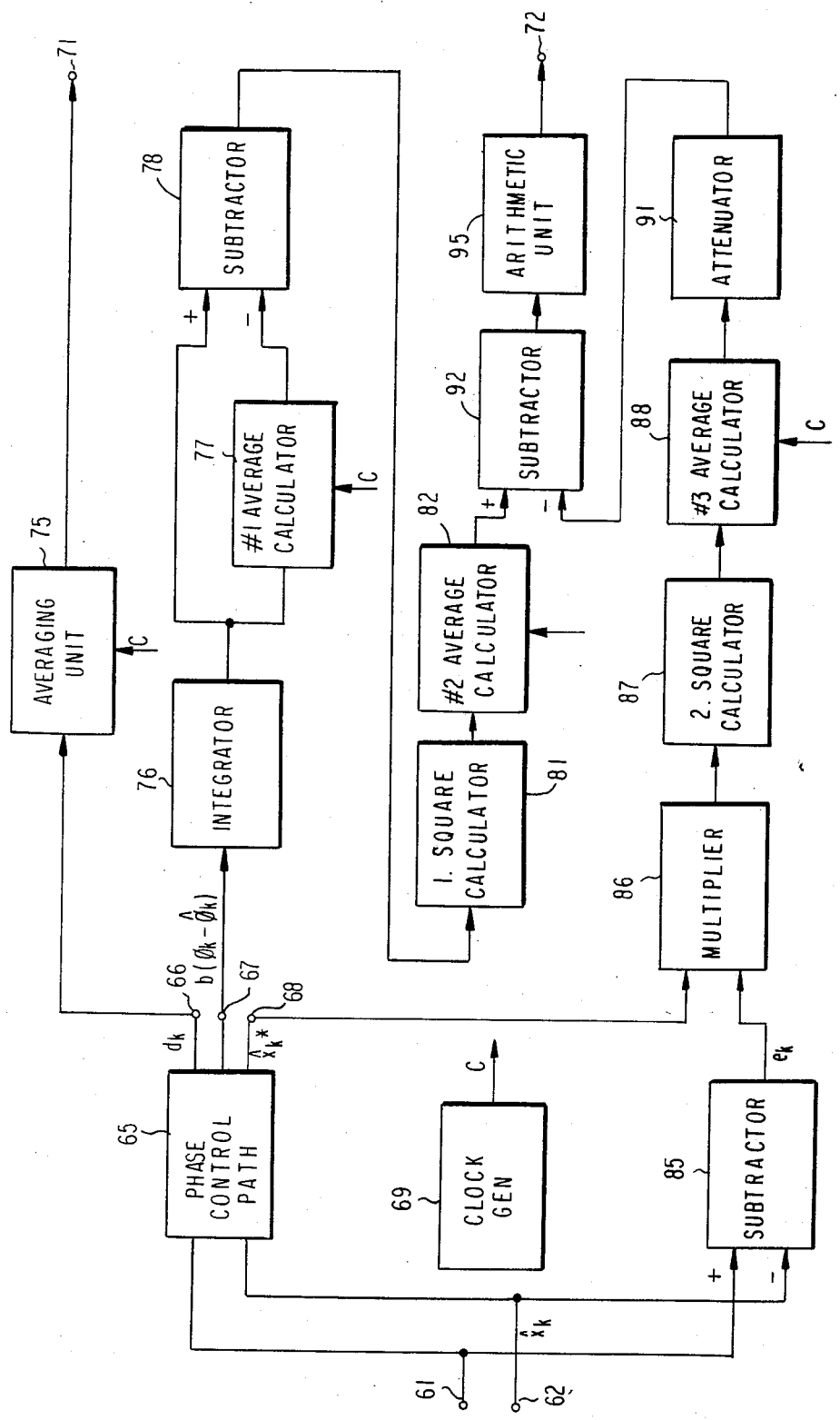
FIG. 6 is a block diagram of a device for use in carrying out a method according to a third embodiment of this invention.

Referring now to FIG. 6, a device, for use in carrying out a method according to a third embodiment of this invention, is for connection to the receiver illustrated with reference to FIG. 1. The device is for measuring that portion of the quality measure which is related to the carrier phase disturbance.

First and second device input terminals 61 and 62 are for the phase controlled baseband signal $[y_k \cdot \exp(j\hat{\phi}_k)]$ and the reproduced data signal $x_k$ like the input terminals 16 and 17 described in conjunction with FIG. 4. An automatic phase control path 65 is what is included in the automatic phase control loop of the receiver. Responsive to the phase controlled baseband signal and the reproduced data signal, the automatic phase control path 65 delivers the integrated phase error signal $d_k$ to a first intermediate terminal 66, the phase error signal $b(\phi_k - \hat{\phi}_k)$ to a second intermediate terminal 67, and the conjugate complex signal $x_k^*$ to a third intermediate terminal 68. A clock generator 69 is for generating clocks C like the clock generator 19 (FIG. 4). When the device being illustrated, is used together with the device described before in connection with FIG. 4 or 5, it is possible to use either of the clock generators 19 and 69 alone in common to such devices.

First and second device output terminals 71 and 72 are for a first and a second device output signal, respectively. As will be described in the following, the first device output signal indicates the carrier frequency offset component. The second device output signal indicates the carrier phase jitter component.

The integrated phase error signal $d_k$ is delivered to an integration error signal averaging unit 75. The clocks C are used to control clearing, scaling, and holding of the averaging unit 75. Controlled in this manner, the averaging unit 75 calculates an average of the integrated phase error signal $d_k$ during each averaging interval LT, as from an $(M-1)$L-th sampling instant $(M-1)$LT to an $(ML-1)$-th sampling instant $(ML-1)$T. The averaging unit 75 produces an averaged signal, which is fed to the first device output terminal 71. The averaged indicates the carrier frequency offset component by:

$$\sum_{k=(M-1)L}^{ML-1} d_k/L.$$

The base error signal $b(\phi_k - \hat{\phi}_k)$ is integrated by an integrator 76 which corresponds to the first integrator 56 (FIG. 1). The integrator 76 produces an integration signal which represents an integration $\phi'_k$ of:

$$\phi'_k = \phi'_{k-1} + b(\phi_k - \hat{\phi}_k), (\text{mod } 2\pi)$$

at each sampling instant kT. Inasmuch as the integrator 76 corresponds to the first integrator 56, the integration signal may be called an integrated phase error signal as the case may be. Calculating an average of the integration during the averaging interval LT in response to the clocks C, a first average calculator 77 produces an averaged signal. The average will now be denoted by $<\phi'_{k-L}>$, which is equal to:

$$<\phi'_{k-L}> = \sum_{k=(M-1)L}^{ML-1} \phi'_k/L.$$

A subtractor 78 is for subtracting the averaged signal from the integration signal to produce a difference signal. The difference signal represents the estimated phase difference $\hat{\phi}_k$ which is exempted from the constant phase difference and from the influence of the carrier frequency offset component.

A first square calculator 81 is for squaring the difference signal to produce a first square signal representative of a first square. Controlled by the clocks C, a second average calculator 82 averages the first square signal to produce a variance signal representative of a variance $\sigma^2$ of the integration $\phi'_k$ from the average thereof. The variance $\sigma^2$ takes a value of:

$$\sigma^2 = \sum_{k=ML}^{(M-1)L-1} (\phi'_k - <\phi'_{k-L}>)^2/L.$$

during the averaging interval LT from an $(M-1)$L-th sampling instant $(M-1)$LT on. The variance gives an estimated value for the variance of the carrier phase jitter component. The estimated value, however, includes components which result from the noise and from the intercode interference. The estimated value may therefore have only an insufficient precision depending on the circumstances. The precision is raised as will be described in the following.

An input subtractor 85 is for subtracting the reproduced data signal $x_k$ from the phase controlled baseband signal $[y_k \cdot \exp(j\phi_k)]$ to produce a code error signal representative of a code error $e_k$ at each sampling instant kT. A multiplier 86 is for multiplying the code error signal by the conjugate complex signal $x_k^*$ so as to produce a product signal. Responsive to the product signal, a second square calculator 87 produces a second square signal representative of a second square $(d_k \cdot x_k^*)^2$. Averaging the second square during the averaging interval LT in response to the clocks C, a third average calculator 88 produces a mean square signal representative of a mean of the second square signal and holds the mean square during the averaging interval LT which next follows the interval of calculation of the mean square under consideration. The mean square is equal to:

$$\sum_{k=(M-1)L}^{ML-1} (Re[e_k \cdot x_k^*])^2/L,$$

and is held from an ML-th sampling instant MLT on. The mean square represents the power which results mainly from the noise and the intercode interference and is independent of the carrier phase jitter component.

Consideration will now be given to a two-dimensional distribution which the data symbols $x_k$ have. It is thereby possible to take an equivalent frequency band into account. An attenuator 91 is for giving the mean square signal an attenuation which is equal to a ratio of the frequency band of the automatic phase control loop to the equivalent frequency band. The attenuator 91 thereby produces an adjustment signal representative of an amount of influence caused to the received signal by the noise component and by the intercode interference component.

An output subtractor 92 is for subtracting the adjustment signal from the variance signal to produce a carrier phase jitter signal representative of the variance of the carrier phase jitter component. An arithmetic unit 95 is responsive to the carrier phase jitter signal for supplying the second device output terminal 72 with the second device output signal representative of the carrier phase jitter component on a desired scale. The arithmetic unit 95 corresponds to the scaler 43 (FIG. 4 or 5).

Figure 7:
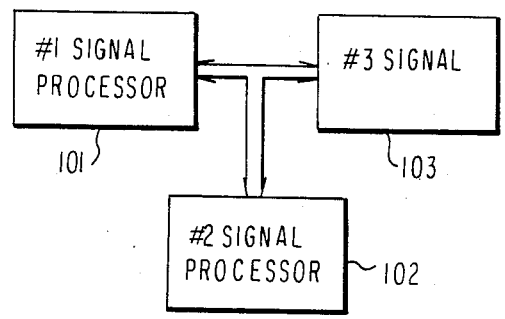
FIG. 7 is a block diagram of a combination of a receiver and a device of the types depicted in FIG. 1 and in any one of FIGS. 4 through 6, respectively.

Referring to FIG. 7, it is possible to use a plurality of signal processors for the receiver and the signal quality measuring device of the type illustrated with reference to any one of FIGS. 4 through 6. A first signal processor 101 serves as a combination of the input multiplier 13 and the decision circuit 15. A second signal processor 102 serves as a combination of the local oscillator 12, the phase control path 66 (FIG. 6), and the clock generator 19 or 69. A third signal processor 103 serves as those portions of the device illustrated with refererence to FIGS. 4, 5, and/or 6, from which portions included in the second signal processor 102 are removed. The third signal processor 103 receives necessary information as digital words from the first and the second signal processors 101 and 102 and carries out the calculation described before.

Figure 8:
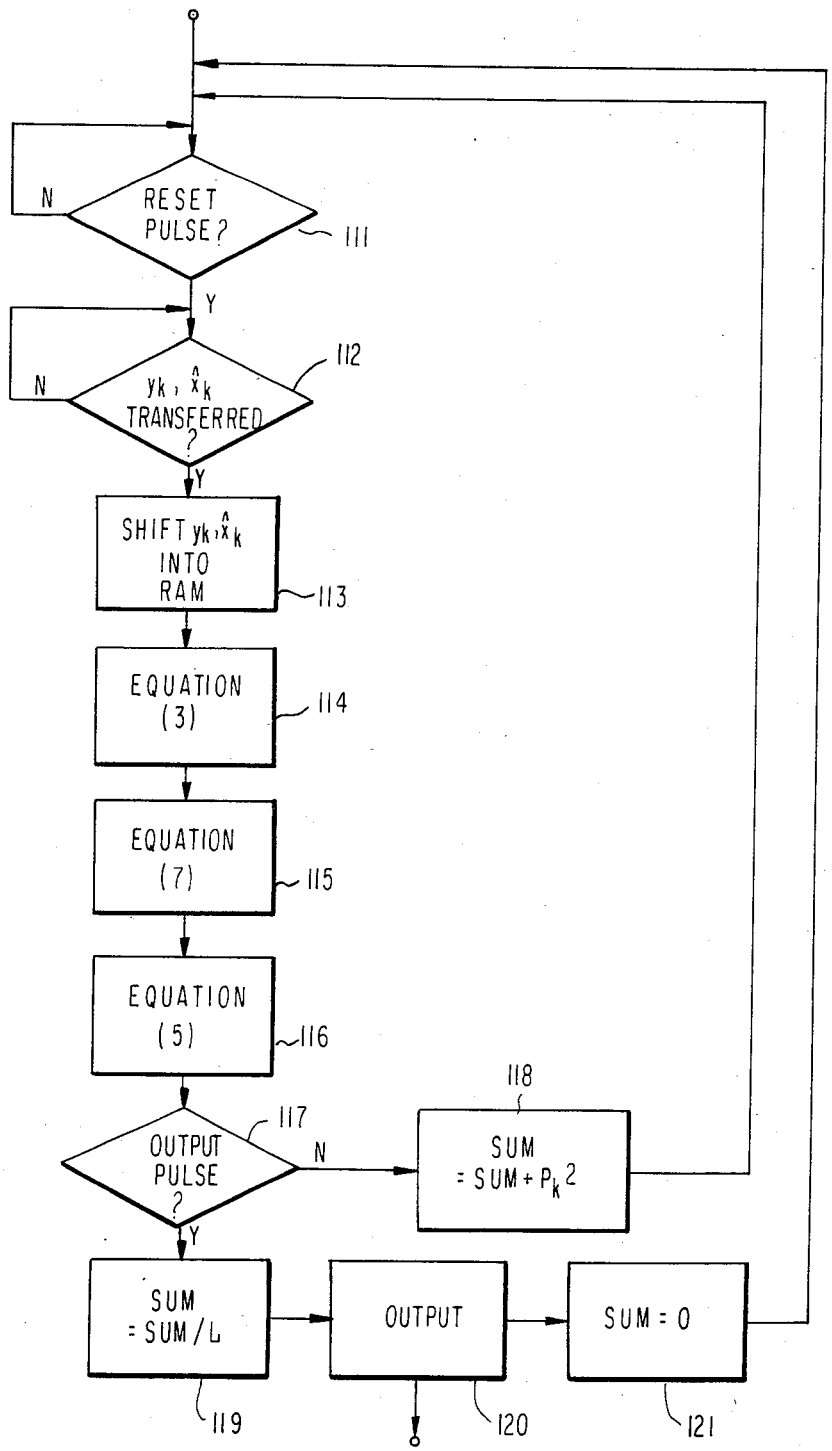
FIG. 8 is a flow chart for use in describing operation of the device shown in FIG. 7.

Turning to FIG. 8, a flow chart is dhown with a view to exemplifying calculation of the noise power. At a first step 111, the third signal processor 103 (FIG. 7) repeatedly checks presence and absence of the phase controlled baseband signal as indicated by "reset pulse." In the presence of the phase controlled baseband signal, check is repeatedly carried out at a second step 112 as regards completion of transfer of th baseband signal samples $y_k$ and the estimated symbols $x_k$ from the first signal processor 101. The notation $y_k$ is herein used merely for simplicity of denotation. At a third step 113, the transferred baseband signal samples and estimated symbols are shifted into a random access memory (RAM) which will presently be described.

At fourth and fifth steps 114 and 115, Equations (3) and (7) are calculated. Although calculation of Equations (3) and (7) is self-adaptively carried out, it is usual in such a flow chart to depict the calculation in two steps. Equation (5) is calculated at a sixth step 116. Timed by the clocks C at a seventh step 117, check is carried out for lapse of the averaging interval LT. Before lapse of the averaging interval, the square $P_k^2$ is added to an accumulation of the squares as indicated by "sum = sum + $P_k^2$" in an eighth step 118 through a lop comprising the steps 111 to 117. Upon arrival at the averaging interval, the average is calculated at a ninth step 119 as labelled "sum = sum/L." A signal indicative of the noise power is produced at a tenth step 120 as indicated by "output." Thereafter, the sum is initialized to zero at an eleventh step 121. The third signal processor 103 is ready for calculation of the noise power for a next subsequent averaging interval.

Figure 9:
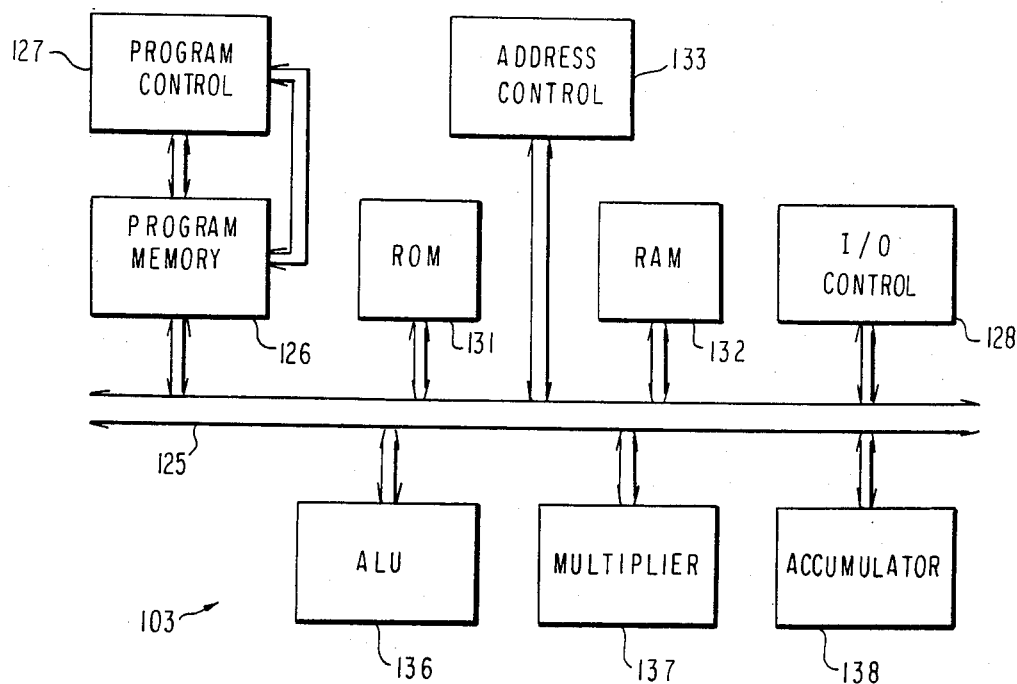
FIG. 9, drawn below FIG. 7 merely for convenience of illustration, is a detailed block diagram of an example of the device illustrated in FIG. 7.

Finally referring to FIG. 9, the third signal processor 103 may comprise a bus 125 supplied with the clocks C and the digital words. A program memory 126 is preliminary loaded with a program of the type illustrated with reference to the flow chart of FIG. 8. A program control unit 127 is for reading the program and for making the program memory 126 supply the bus 125 with instructions or commands. In accordance with the program, an input-output control unit 128 checks the reset pulses, the transfer of the baseband signal samples and the estimated symbols, the averaging interval, and the like.

A read-only memory (ROM) 131 is preliminarily loaded with various constants for use in calculating the quality measure. An RAM 132 is for storing various variables, such as the baseband signal samples and the estimated symbols mentioned before. An address control unit 133 is for accessing the ROM 131 and the RAM 132 in compliance with the program. An arithmetic logic unit (ALU) 136 and a multiplier 137 are for carrying out the calculation specified by the program. The multiplier 137 comprises registers (not shown) for holding multiplicands, multipliers, dividends, divisors, and so forth. An accumulator 138 is for holding the results of calculation.

It will now readily be possible for one skilled in the art to calculate the carrier frequency offset component and/or the carrier phase jitter component by the signal processor 103 of the type described. Assignment of various functions of the receiver and the quality measure calculating device to the signal processors 101 through 103 is not restricted to that illustrated above with reference to FIG. 7. The receiver may be implemented by a signal processor which is similar in function to that described in conjunction with FIG. 9.

Incidentally, the variance signal produced by the second average calculator 82 (FIG. 6) is another mean square signal. When it is unnecessary to refer to the signal produced by the third average calculator 88, the variance signal can be called a mean square signal.

What is claimed is:

1. A method for use in a receiver of a two-dimensional linear modulation data communication system, said receiver being responsive to a received signal received through a transmission channel of said system for producing a phase controlled baseband signal and a reproduced data signal derived from said phase controlled baseband signal, said method comprising the steps of:

measuring a quality measure of said received signal by using said phase controlled baseband signal and said reproduced data signal with said quality measure divided into portions related to a noise component, a carrier phase jitter component, and a carrier frequency offset component, each component being introduced into said received signal in said transmission channel;

using said reproduced data signal in estimating a data signal component which is influenced by an intercode interference component introduced into said received signal in said transmission channel;

subtracting said data signal component from said phase controlled baseband signal to produce a difference signal having a phase difference relative to said data signal component;

giving said phase difference to said difference signal to produce a phase adjusted signal; and calculating a mean square of an inphase component of said phase adjusted signal to provide that portion of said quality measure which is related to said noise component.

2. A method for use in a receiver of a two-dimensional linear modulation data communication system, said receiver being responsive to a received signal received through a transmission channel of said system for producing a phase controlled baseband signal and a reproduced data signal derived from said phase controlled baseband signal, said method comprising the steps of:

measuring a quality measure of said received signal by using said phase controlled baseband signal and said reproduced data signal with said quality measure divided into portions related to a noise component, a carrier phase jitter component, and a carrier frequency offset component, each component being introduced into said received signal in said transmission channel;

using said reproduced data signal in estimating a data signal component which is influenced by an intercode interference component introduced into said received signal in said transmission channel;

subtracting said data signal component from said phase controlled baseband signal to produce a difference signal having a phase difference relative to said reproduced data signal;

giving said phase difference to said difference signal to produce a phase adjusted signal; and calculating a mean square of an inphase component of said phase adjusted signal to provide that portion of said quality measure which is related to said noise component.

3. A method for use in a receiver of a two-dimensional linear modulation data communication system, said receiver being responsive to a received signal received through a transmission channel of said system for producing a phase controlled baseband signal and a reproduced data signal derived from said phase controlled baseband signal, said method comprising the steps of:

measuring a quality measure of said received signal by using said phase controlled baseband signal and said reproduced data signal with said quality measure divided into portions related to a noise component, a carrier phase jitter component, and a carrier frequency offset component, each component being introduced into said received signal in said transmission channel; and wherein said receiver produces an integrated phase error signal for use in phase controlling said received signal to produce said phase controlled baseband signal;

said method further comprising the step of:

averaging said integrated phase error signal to produce an averaged signal representative of that portion of said quality measure which is related to said carrier frequency offset component.

4. A method for use in a receiver of a two-dimensional linear modulation data communication system, said receiver being responsive to a received signal received through a transmission channel of said system for producing a phase controlled baseband signal and a reproduced data signal derived from said phase controlled baseband signal, said method comprising the step of:

measuring a quality measure of said received signal by using said phase controlled baseband signal and said reproduced data signal with said quality measure divided into portions related to a noise component, a carrier phase jitter component, and a carrier frequency offset component, each component being introduced into said received signal in said transmission channel; and wherein said receiver produces an integrated phase error signal for use in controlling said received signal to produce said phase controlled baseband signal;

said method further comprising the steps of:

averaging said integrated phase error signal to produce an averaged signal representative of that portion of said quality measure which is related to said carrier frequency offset component;

subtracting said averaged signal from said integrated phase error signal to produce a difference signal representative of a phase error;

calculating a means square of said phase error to produce a mean square signal;

using said phase controlled baseband signal and said reproduced data signal in producing an adjustment signal representative of an amount of influence caused to said mean square signal by said noise component and by an intercode interference component which are introduced into said received signal in said transmission channel; and subtracting said adjustment signal from said mean square signal to provide that portion of said quality measure which is related to said carrier phase jitter component.

* * * * *